(12) United States Patent
Kannan et al.

(10) Patent No.: US 12,237,948 B2
(45) Date of Patent: Feb. 25, 2025

(54) LOW-SPEED RING WITH CONTROLLED JITTER

(71) Applicant: Waymo LLC, Mountain View, CA (US)

(72) Inventors: Kaushik Kannan, Mountain View, CA (US); Pieter Kapsenberg, Santa Clara, CA (US); Pierre-Yves Droz, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 59 days.

(21) Appl. No.: 18/068,099

(22) Filed: Dec. 19, 2022

(65) Prior Publication Data
US 2024/0205054 A1 Jun. 20, 2024

(51) Int. Cl.
*H04L 25/02* (2006.01)

(52) U.S. Cl.
CPC ...... *H04L 25/0292* (2013.01); *H04L 25/0272* (2013.01)

(58) Field of Classification Search
CPC . H04L 25/0292; H04L 25/0272; G11C 7/062; G11C 7/067; H03K 5/2418; H03K 5/2445; H03K 5/2481; H03K 4/00; H03K 5/04; G01R 19/0038
See application file for complete search history.

(56) References Cited

U.S. PATENT DOCUMENTS

| 8,797,063 | B2 | 8/2014 | Choo et al. |
| 8,855,503 | B2 | 10/2014 | Kikuci |
| 11,018,773 | B1 | 5/2021 | Lantz et al. |
| 2017/0019093 | A1* | 1/2017 | Kanda ................. H01L 29/7838 |
| 2022/0109507 | A1 | 4/2022 | Tanaka |
| 2022/0113407 | A1 | 4/2022 | Wang et al. |

FOREIGN PATENT DOCUMENTS

| CN | 104113740 B | 6/2017 |
| CN | 105208467 B | 5/2018 |
| CN | 216490818 U | 5/2022 |
| EP | 4050823 A1 | 8/2022 |
| KR | 20200051226 A | 5/2020 |

OTHER PUBLICATIONS

Olave et al., "Design and characterization of the FAST chip: a front-end for 4D tracking systems based on Ultra-Fast Silicon Detectors aiming at 30 ps time resolution," Nuclear Inst. and Methods in Physics Research, A, 2021, 6 pages.

* cited by examiner

*Primary Examiner* — Jung Kim
(74) *Attorney, Agent, or Firm* — McDonnell Boehnen Hulbert & Berghoff LLP

(57) ABSTRACT

Communication links, computing systems, and methods for their use. The communication link includes a low-voltage differential signaling (LVDS) driver. The LVDS driver is configured to provide a differential signal that is based on a digital bit stream. The digital bit stream includes a series of digital bits that are temporally arranged based on a nominal bit period. The communication link also includes a controllable delay device. The controllable delay device is configured to provide a delay signal to the LVDS driver so as to cause a rising edge or a falling edge of respective digital bits to vary in time with respect to the nominal bit period based on a predetermined sequence of delay amounts. The delay amounts represent positive and negative differences in time from the nominal bit period.

19 Claims, 12 Drawing Sheets

LOW-SPEED RING WITH CONTROLLED JITTER

BACKGROUND

Unless otherwise indicated herein, the description in this section is not prior art to the claims in this application and is not admitted to be prior art by inclusion in this section.

Electronic circuits and devices that operate based on clocked processors and/or produce other types of periodic signals can act as sources for undesirable electromagnetic interference (EMI). As an example, a high-speed digital signal driver operating at 100 MHz may exhibit a power spectral density (PSD) with narrow, high amplitude peaks associated with multiples of the operating frequency. For compact, mixed signal (e.g., commingled analog and digital circuits) electronic systems and multi-frequency electronic systems having a small physical footprint, such large, narrow PSD spikes may lead to overall reduced signal to noise ratio (SNR) and in extreme cases, electronic glitches or logic hazards.

Conventional ways to suppress EMI in circuits can include physical means such as a resistor in series with a capacitor (e.g., a snubber network), ferrite cores, and/or ferrite beads. Other conventional means to mitigate EMI include system design techniques such as power factor correction. However, such techniques are not always available for high current applications or in applications where SNR is an important factor. Accordingly, new devices and methods that can reduce PSD spikes in complex electronic systems are needed and desirable.

SUMMARY

This disclosure relates to methods and systems that can beneficially provide predetermined amounts of temporal offset to portions of a digital signal so as to reduce frequency-specific noise.

In a first aspect, a communication link is provided. The communication link includes a low-voltage differential signaling (LVDS) driver. The LVDS driver is configured to provide a differential signal that is indicative of a digital bit stream. The digital bit stream includes a series of digital bits that are temporally arranged based on a nominal bit period. The communication link also includes a controllable delay device. The controllable delay device is configured to provide a delay signal to the LVDS driver so as to cause a rising edge or a falling edge of respective digital bits to vary in time with respect to the nominal bit period based on a predetermined sequence of delay amounts. The delay amounts represent positive and negative differences in time from the nominal bit period.

In a second aspect, a computing system is provided. The computing system includes a low-voltage differential signaling (LVDS) driver. The LVDS driver is configured to provide a differential signal that is indicative of a digital bit stream. The digital bit stream includes a series of digital bits that are temporally arranged based on a nominal bit period. The computing system also includes a controllable delay device. The controllable delay device is configured to provide a delay signal to the LVDS driver so as to cause a rising edge or a falling edge of respective digital bits to vary in time with respect to the nominal bit period based on a predetermined sequence of delay amounts. The delay amounts represent positive and negative differences in time from the nominal bit period. The computing system additionally includes a controller. The controller includes a memory and at least one processor. The at least one processor is operable to execute program instructions stored in the memory so as to carry out operations. The operations include determining, by the controllable delay device, the predetermined sequence of delay amounts and receiving information indicative of the digital bit stream. The operations further include forming by the LVDS driver, based on the digital bit stream and the predetermined sequence of delay amounts, a jittered bit stream representing a series of digital bits. Each digital bit is delayed with respect to the nominal bit period by a respective delay amount.

In a third aspect, a method is provided. The method includes determining, by a controllable delay device, a predetermined sequence of delay amounts. The delay amounts represent positive and negative differences in time from a nominal bit period. The method also includes receiving information indicative of a digital bit stream. The method additionally includes forming by a low-voltage differential signaling (LVDS) driver, based on the digital bit stream and the predetermined sequence of delay amounts, a jittered bit stream representing a series of digital bits. Each digital bit is delayed by a respective delay amount with respect to the nominal bit period. The method yet further includes sampling by a differential receiver, the series of digital bits during respective periodic sampling windows that are based on multiples of the nominal bit period.

These as well as other aspects, advantages, and alternatives will become apparent to those of ordinary skill in the art by reading the following detailed description, with reference, where appropriate, to the accompanying drawings.

DETAILED DESCRIPTION

Figure 1:
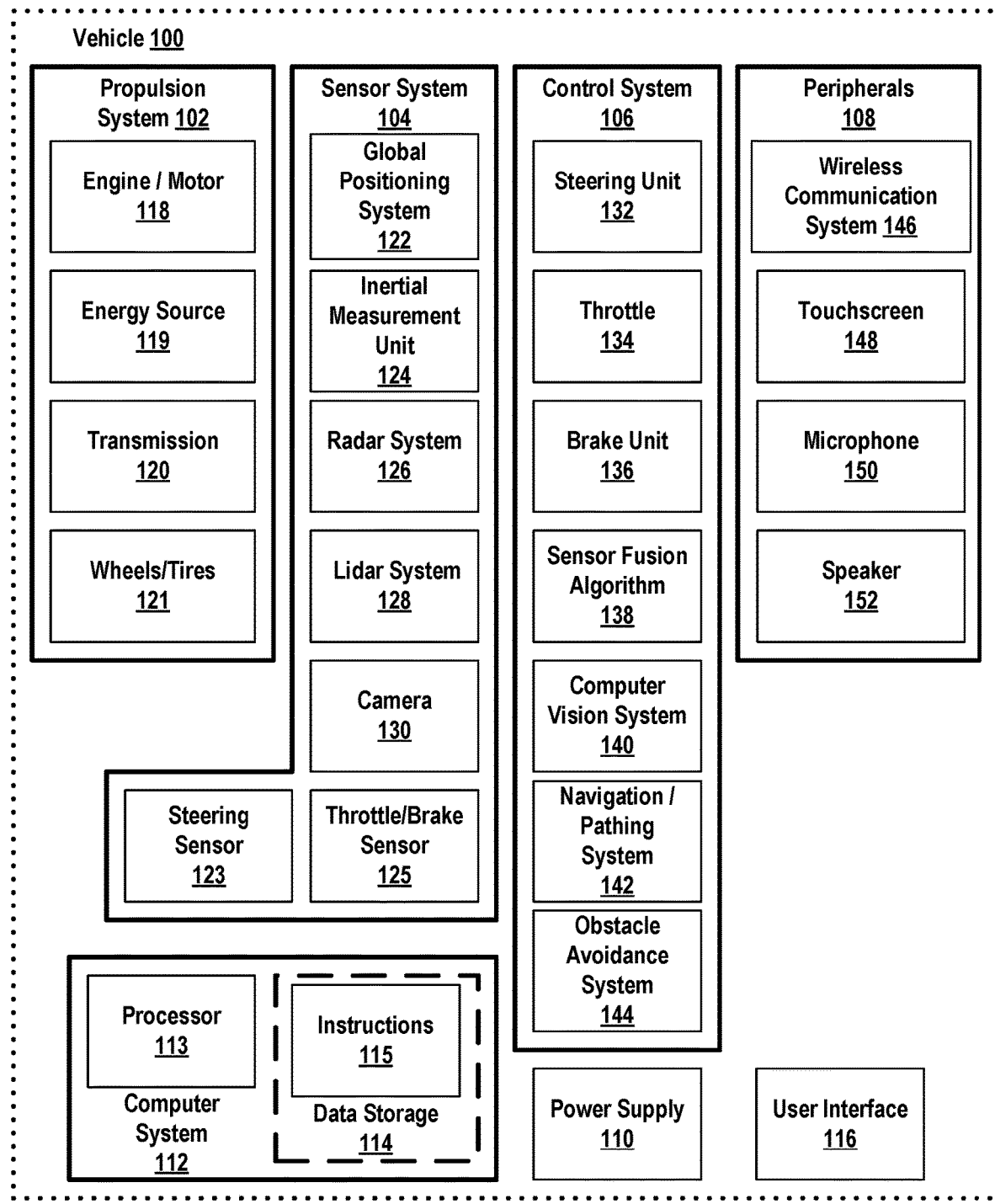
FIG. 1 is a functional block diagram illustrating a vehicle, according to example embodiments.
Figure 2A:
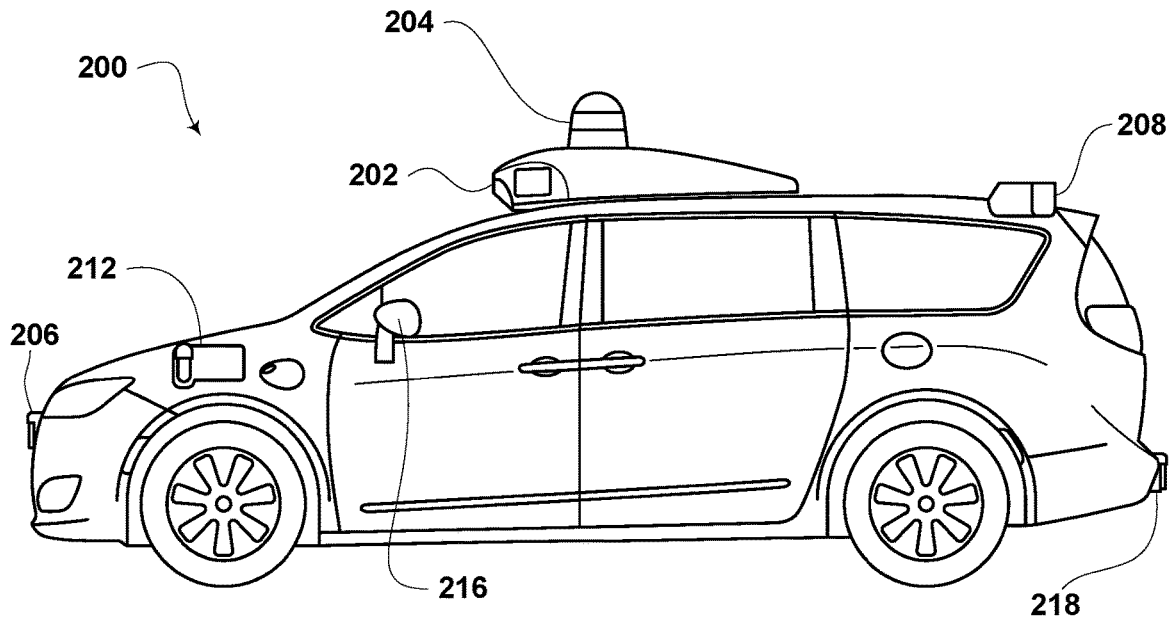
FIG. 2A is an illustration of a physical configuration of a vehicle, according to example embodiments.
Figure 2B:
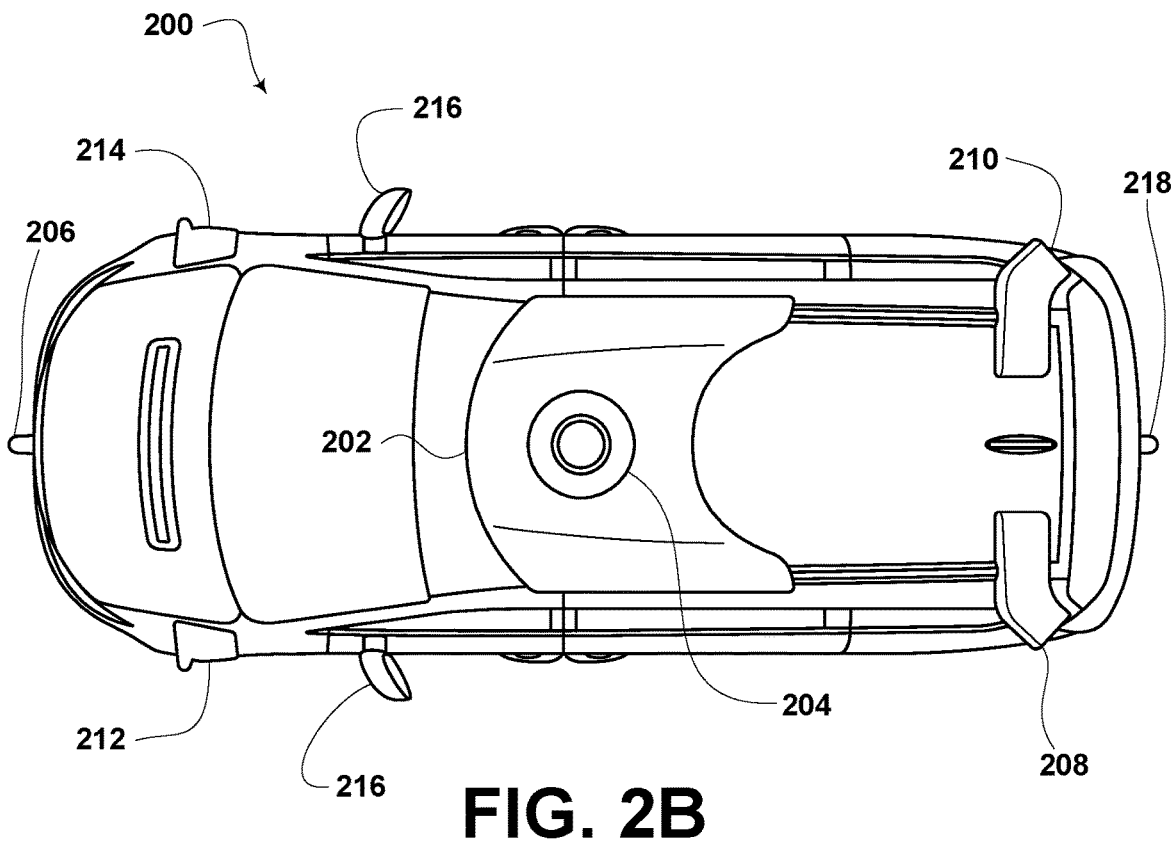
FIG. 2B is an illustration of a physical configuration of a vehicle, according to example embodiments.
Figure 2C:
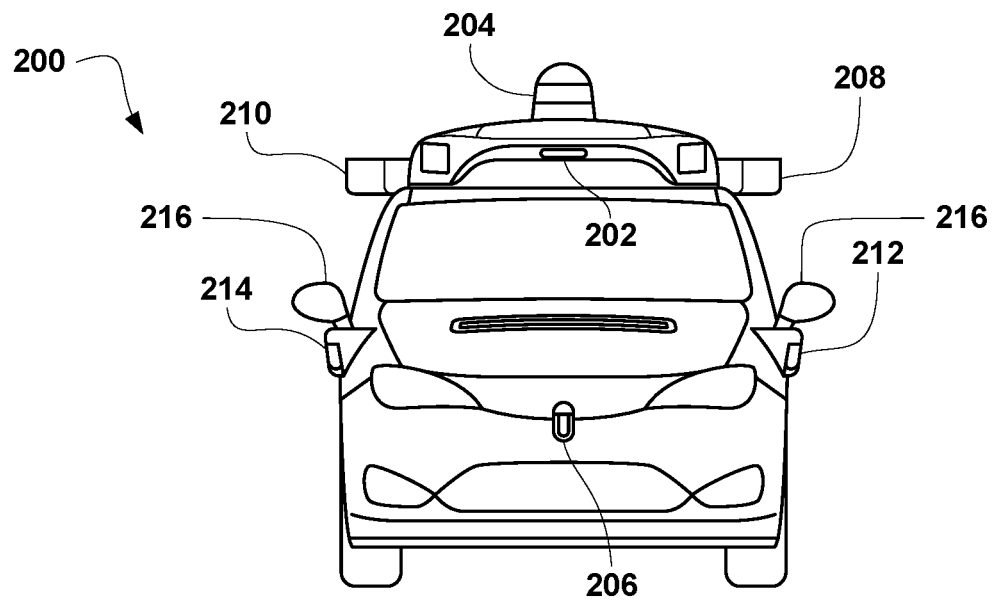
FIG. 2C is an illustration of a physical configuration of a vehicle, according to example embodiments.
Figure 2D:
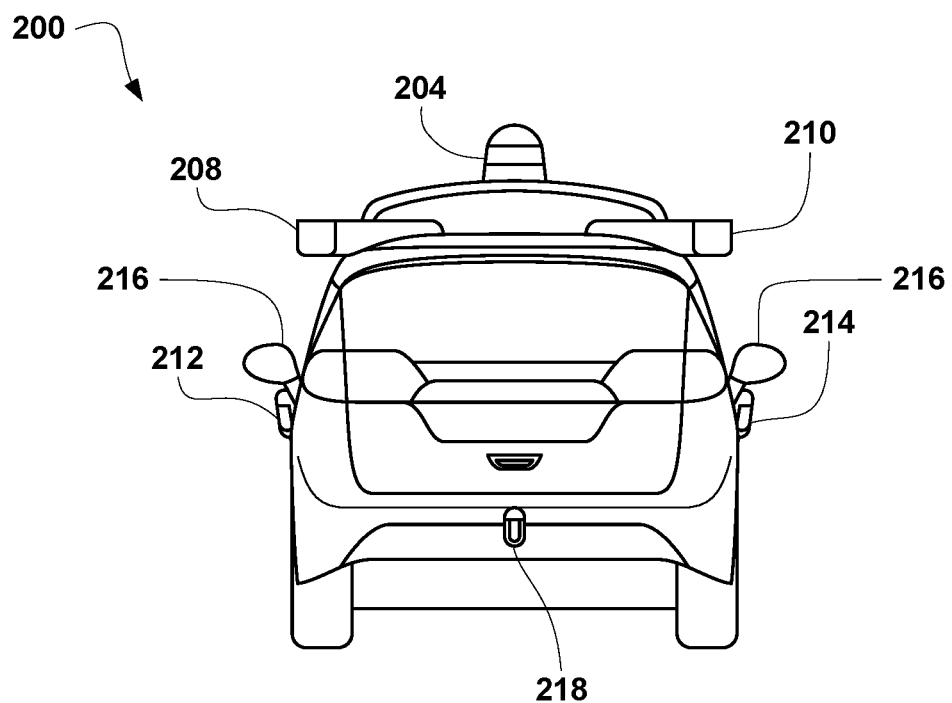
FIG. 2D is an illustration of a physical configuration of a vehicle, according to example embodiments.
Figure 2E:
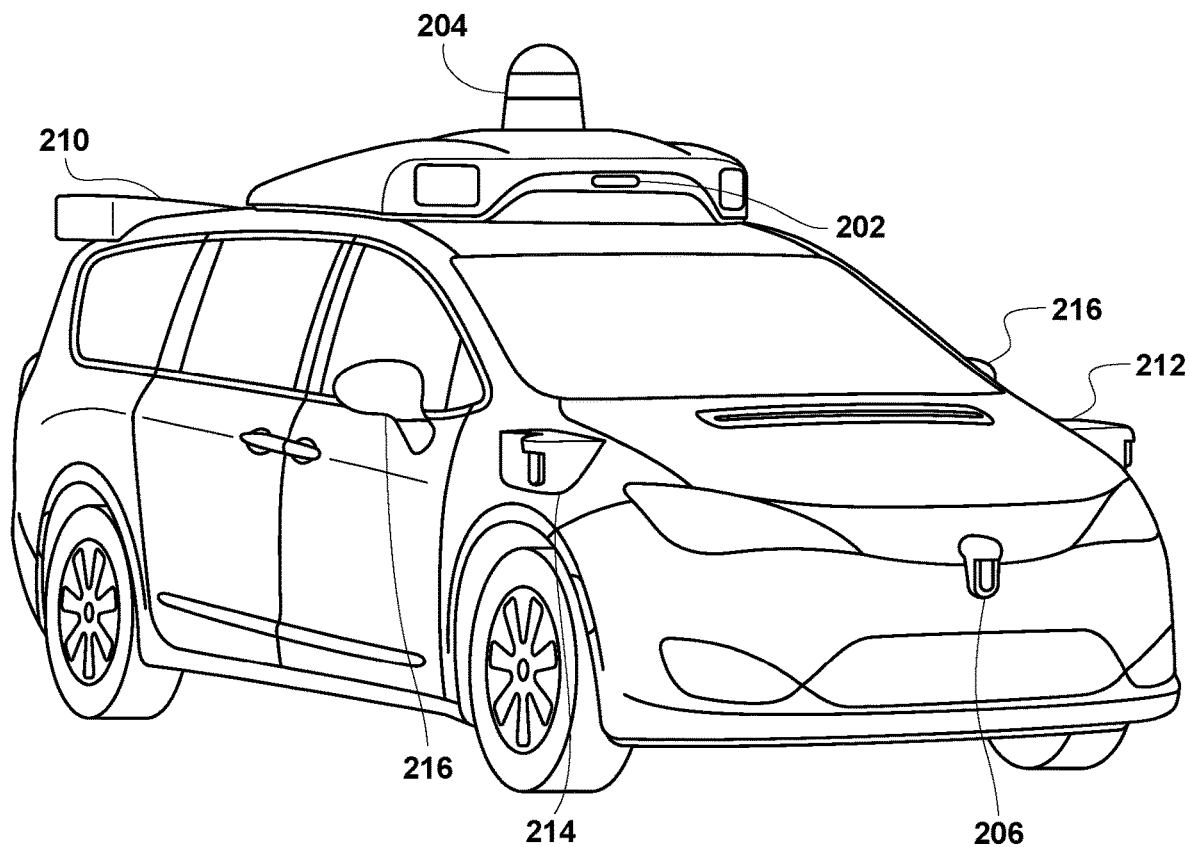
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, bicyclists, roadway surfaces, buildings, and terrain. Additionally, the one or more light emitters could emit light into a local environment of the lidar itself. For example, light emitted from the one or more light emitters could interact with a housing of the lidar and/or surfaces or structures coupled to the lidar. In some cases, the lidar could be mounted to a vehicle, in which case the one or more light emitters could be configured to emit light that interacts with objects within a vicinity of the vehicle. Further, the light emitters could include optical fiber amplifiers, laser diodes, light-emitting diodes (LEDs), among other possibilities.

This disclosure relates to methods and devices that are configured to apply a predetermined temporal delay (e.g., jitter) to data signals when transmitting the data from point-to-point over a communication link. The predetermined temporal delays are varied in a controlled manner so as to provide, in the aggregate, a power spectral density (PSD) that is distributed more broadly across frequency.

In some embodiments, a communication link could be based on a serial data stream transmitted using low-voltage differential signaling (LVDS). LVDS provides a very high speed, low power signaling method using a twisted wire pair. LVDS is a differential signaling system that transmits information as the difference between the voltages on a pair of wires. The two wire voltages are compared at an LVDS receiver. In some embodiments, an LVDS transmitter may provide a constant current of 3.5 mA with the direction of the current based on the digital logic level. The current passes through a termination resistor matched to the cable's characteristic impedance to reduce reflections. Due to electric and magnetic coupling between the two wires, LVDS beneficially provides lower electromagnetic noise as compared to a single wire transmission line. However, in some cases, LVDS signaling can result in external RF emissions and/or internal harmonics, which can be undesirable in the overall electronic system (e.g., a lidar).

To reduce such emissions and harmonics, digitally-injected jitter can be introduced to the data stream so as to reduce and spectrally broaden the frequency noise and spectral noise density. Although jitter is usually undesired in high-speed communications, when provided under the disclosed systems and methods, it can improve reliability and overall system performance.

This disclosure also relates to computing systems (e.g., lidar systems) that may beneficially utilize a communication link with digitally-injected jitter. Autonomous vehicles, semi-autonomous vehicles, vehicles operating in an autonomous mode, and/or vehicles operating in a semi-autonomous mode may use light detection and ranging (lidar) devices to detect their surroundings. Such sensors may be used in object detection and avoidance and/or in navigation, for example. The digitally-injected jitter techniques described herein may beneficially improve the SNR of a lidar receiver. In some embodiments, the lidar receiver may involve a plurality of processors, which may output data into a serial, chain-like processed data pipeline. In such scenarios, a data pipeline configured as a communication link with digitally-injected jitter could be beneficial to reducing narrow frequency EMI while improving the overall operation of the lidar receiver.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, and tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, and brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, and a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, or one or more machine-learned models) operable to process and analyze images in an effort to determine objects that are in motion (e.g., other vehicles, pedestrians, bicyclists, or animals) and objects that are not in motion (e.g., traffic lights, roadway boundaries, speedbumps, or potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, or control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones or sonar devices), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; or one or more lidars, cameras, and radars).

Note that the number, location, and type of sensor systems (e.g., 202 and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, or to adapt to specialized environmental or application circumstances). For example, the sensor systems (e.g., 202 and 204) could be disposed in various other locations on the vehicle (e.g., at location 216) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones or sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane). For example, one or more of the sensor systems 202, 204, 206, 208, 210, 212, 214, and/or 218 may be configured to rotate or pivot about an axis (e.g., the z-axis) perpendicular to the given plane so as to illuminate an environment surrounding the vehicle 200 with light pulses. Based on detecting various aspects of reflected light pulses (e.g., the elapsed time of flight, polarization, or intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208 and 210), to actively scan the environment near the back of the vehicle 200 for the presence of radio-reflective objects. Similarly, one or more radars can be located near the front of the vehicle 200 (e.g., sensor systems 212 or 214) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, or microelectromechanical systems (MEMS) microphones) used to sense acoustic waves (i.e., pressure differentials) in a fluid (e.g., air) of the environment surrounding the vehicle 200. Such acoustic sensors may be used to identify sounds in the surrounding environment (e.g., sirens, human speech, animal sounds, or alarms) upon which control strategy for vehicle 200 may be based. For example, if the acoustic sensor detects a siren (e.g., an ambulatory siren or a fire engine siren), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 3:
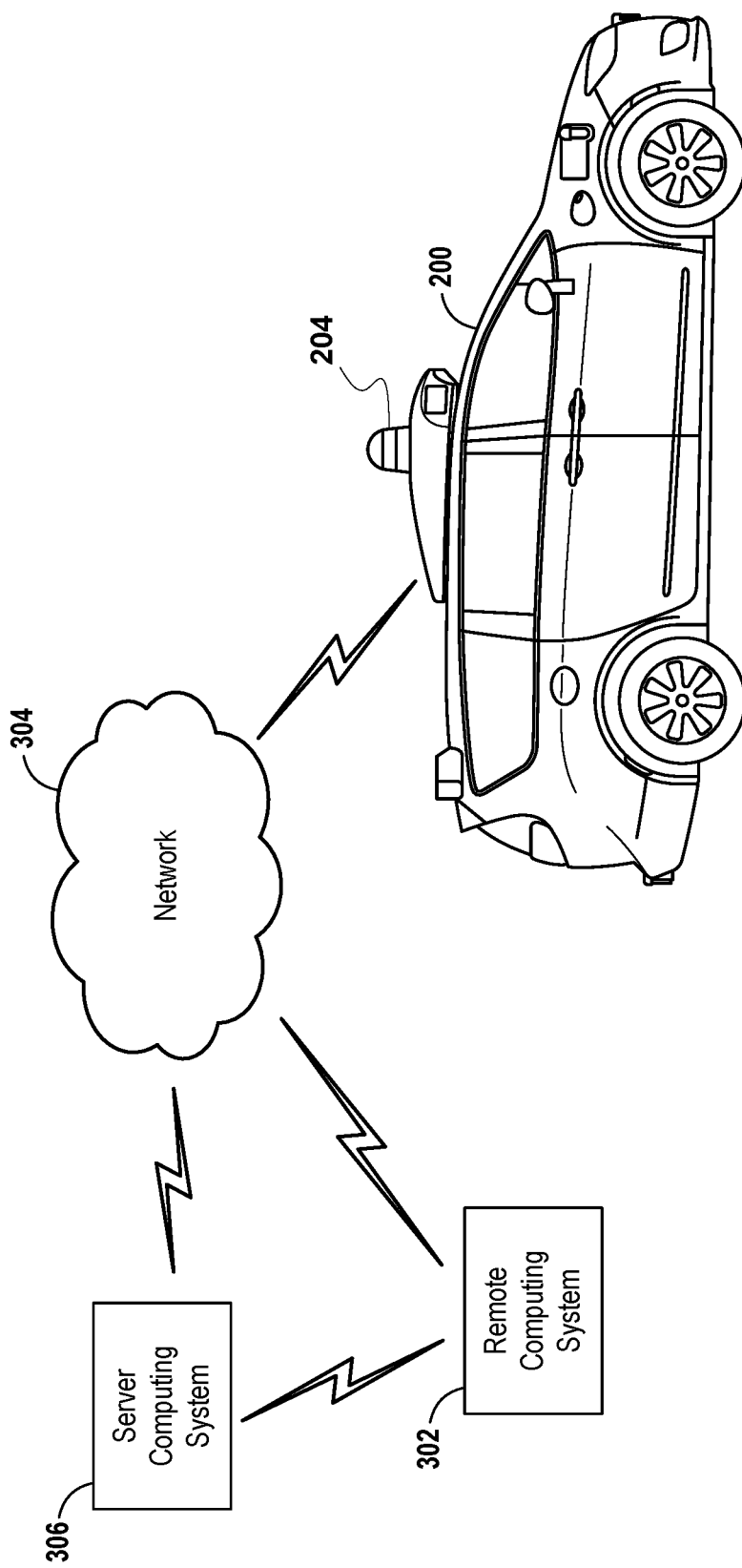
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption. When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
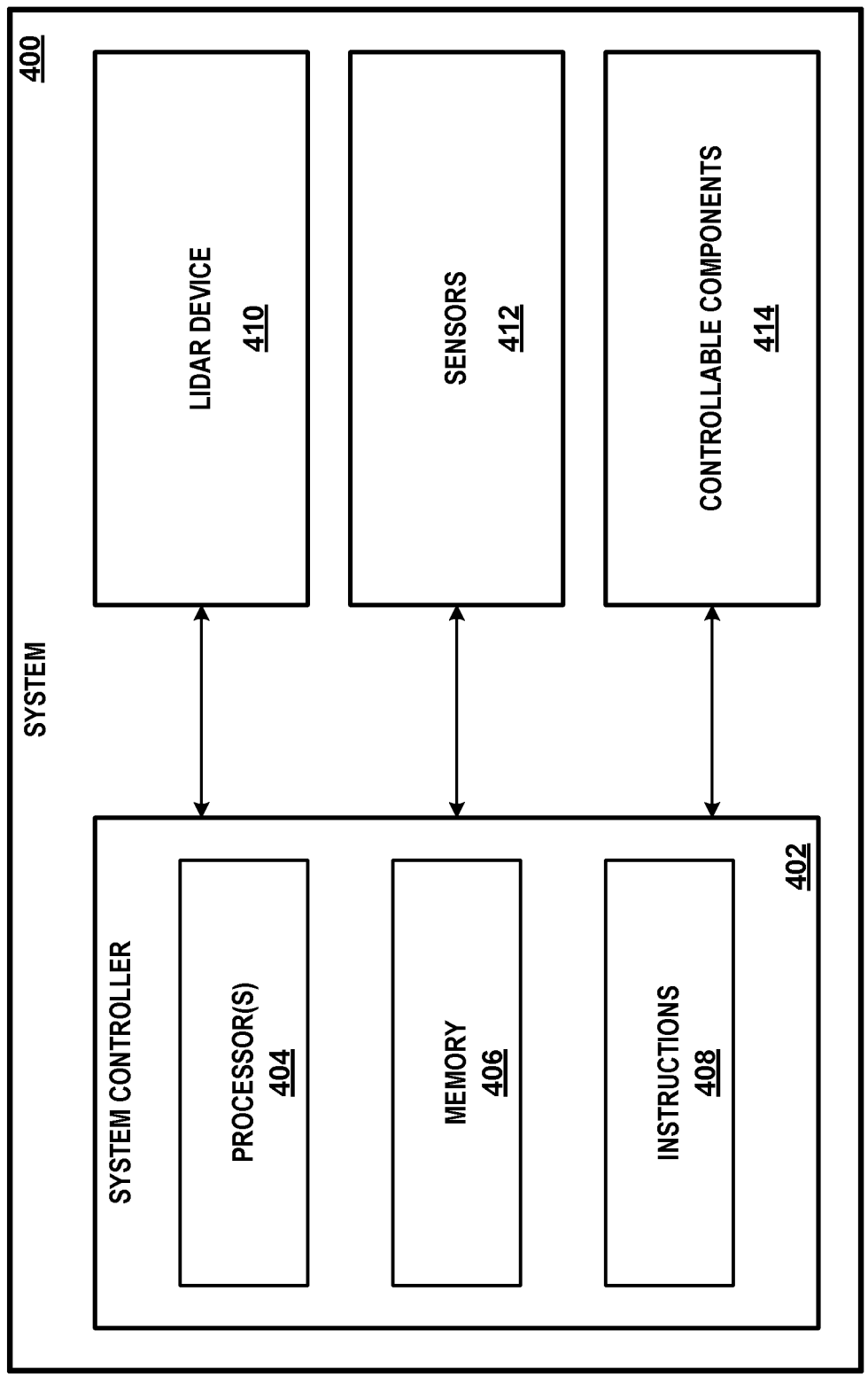
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The lidar device 410, described further below, includes a plurality of light emitters configured to emit light (e.g., in light pulses) and one or more light detectors configured to detect light (e.g., reflected portions of the light pulses). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, or proximity sensing).

Similarly, the system controller 402 may use outputs from the plurality of sensors 412 to determine the characteristics of the system 400 and/or characteristics of the surrounding environment. For example, the sensors 412 may include one or more of a GPS, an IMU, an image capture device (e.g., a camera), a light sensor, a heat sensor, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous or semi-autonomous mode). Within examples, the lidar device 410 and the sensors 412 are also controllable by the system controller 402.

Figure 4B:
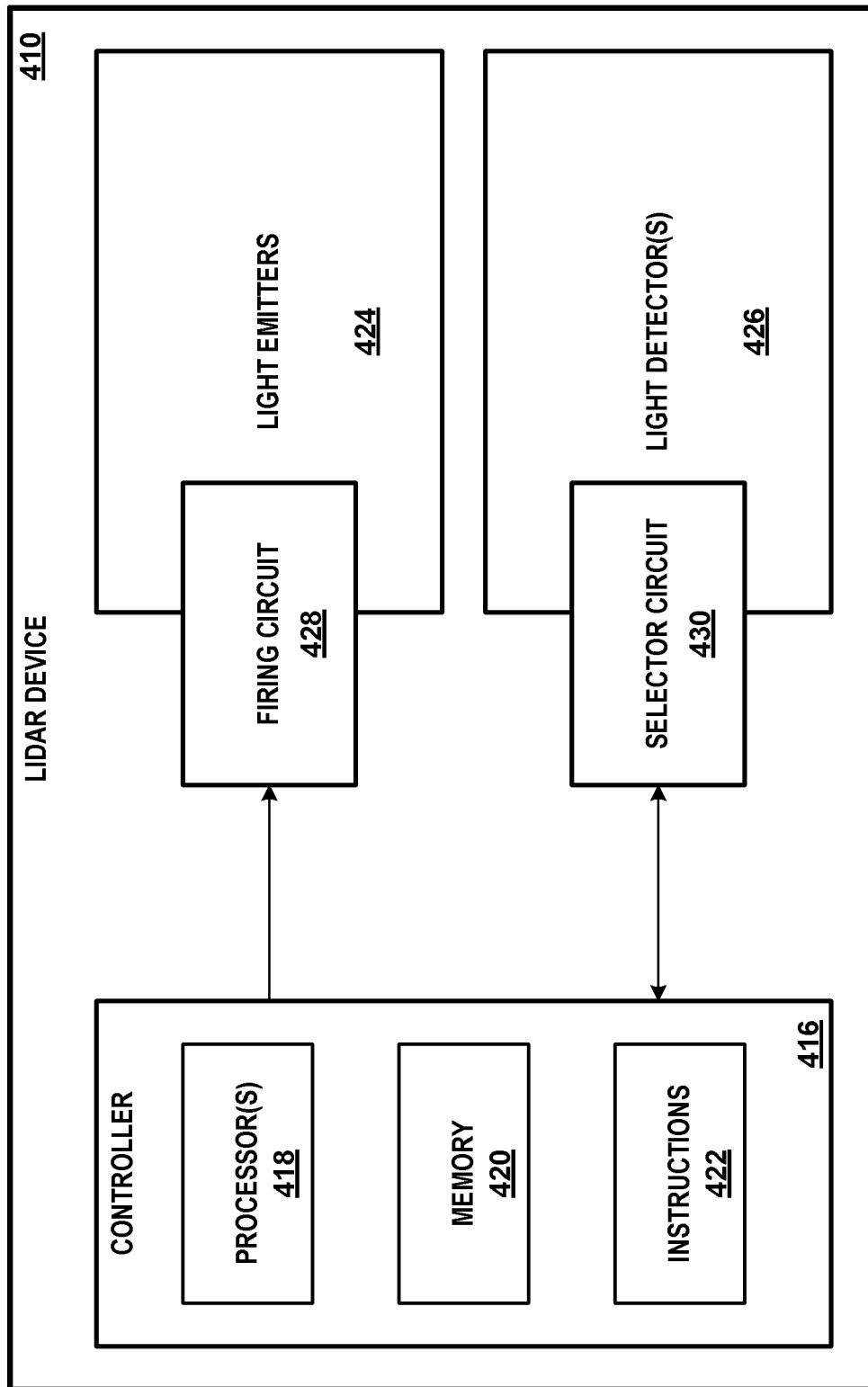
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426, etc. The lidar device 410 further includes a firing circuit 428 configured to select and provide power to respective light emitters of the plurality of light emitters 424 and may include a selector circuit 430 configured to select respective light detectors of the plurality of light detectors 426. The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to memory 406, the memory 420 may include a computer-readable medium, such as a non-transitory, computer-readable medium, such as, but not limited to, ROM, PROM, EPROM, EEPROM, non-volatile random-access memory (e.g., flash memory), a SSD, a HDD, a CD, a DVD, a digital tape, R/W CDs, R/W DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, or construction cones. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system) and intensities of each reflected light pulse.

The firing circuit 428 is used for selecting light emitters for emitting light pulses. The selector circuit 430 similarly is used for sampling outputs from light detectors.

In various example embodiments, autonomous vehicles may utilize an array of active sensors (e.g., lidar and radar) and passive sensors (e.g., camera, microphone, and GPS) for mapping and localizing itself in the environment. Such sensors can be adversely affected by EMI, rendering them ineffective and/or inaccurate.

In some examples, an autonomous vehicle may include a lidar that could utilize a multi-processor computing system. The computing system may include a low-speed ring (LSR) interface connecting multiple chips in a daisy-chain. Each chip could be configured to receive (and process) a portion of LIDAR data over a mobile industry processor interface (MIPI). The LSR could be used for inter-chip communication (to mitigate retro-reflector issues, among other possibilities).

Activity on the LSR could result in EMI on other interfaces (e.g., MIPI) or the sensor (e.g., lidar). To mitigate this EMI, the LSR has a built-in configurable digital jitter injector logic to modulate the width of each transmitted bit pseudo-randomly using a linear feedback shift register (LFSR). Introducing the digital jitter has the effect of spreading out the EM noise (due to LSR activity) over a wider frequency range, thereby minimizing the EMI on other components.

The jitter-injecting systems and methods described herein are based on the fixed packet size (in clock cycles) which must be preserved for reliable communication, while also varying the temporal width of transmitted bits by way of the injected pseudo-random jitter. In such scenarios, the applied jitter is completely transparent to the differential receiver, which always samples data at the center time slot of each bit period.

Figure 5A:
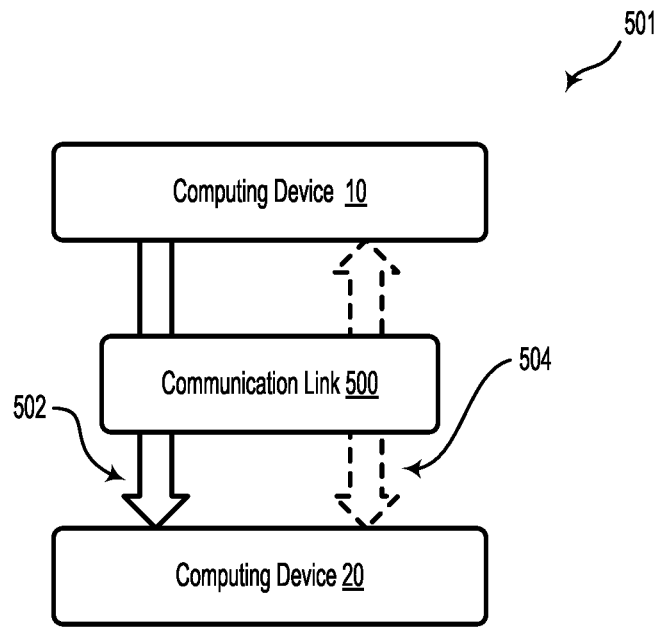
FIG. 5A is a functional block diagram of a scenario, according to example embodiments.

FIG. 5A is a functional block diagram of a scenario 501, according to example embodiments. Scenario 501 includes a first computing device 10 and a second computing device 20. A communication link 500 may communicatively couple the first computing device 10 and the second computing device 20. In some embodiments, the computing devices 10 and 20 could include systems configured to carry out various operations by executing program instructions. The computing devices 10 and 20 could include individual processor units (e.g., central processing units, graphics processing units, neural processing units, vision processing units, tensor processing unit, or digital signal processors), integrated circuits, or other types of computing devices (e.g., field-programmable gate arrays, application-specific integrated circuits).

The communication link 500 may provide a uni-directional communication interface 502 or a bi-directional communication interface 504 between computing device 10 and computing device 20. While two computing devices are illustrated in FIG. 5A, it will be understood that more computing devices could be communicatively coupled by way of one or more instances of the communication link 500. In other words, in some embodiments, communication link 500 could represent a point-to-point communication interface between two computing devices. Additionally or alternatively, communication link 500 could include a multiple-in, multiple-out communication interface configured to connect a plurality of computing devices.

Figure 5B:
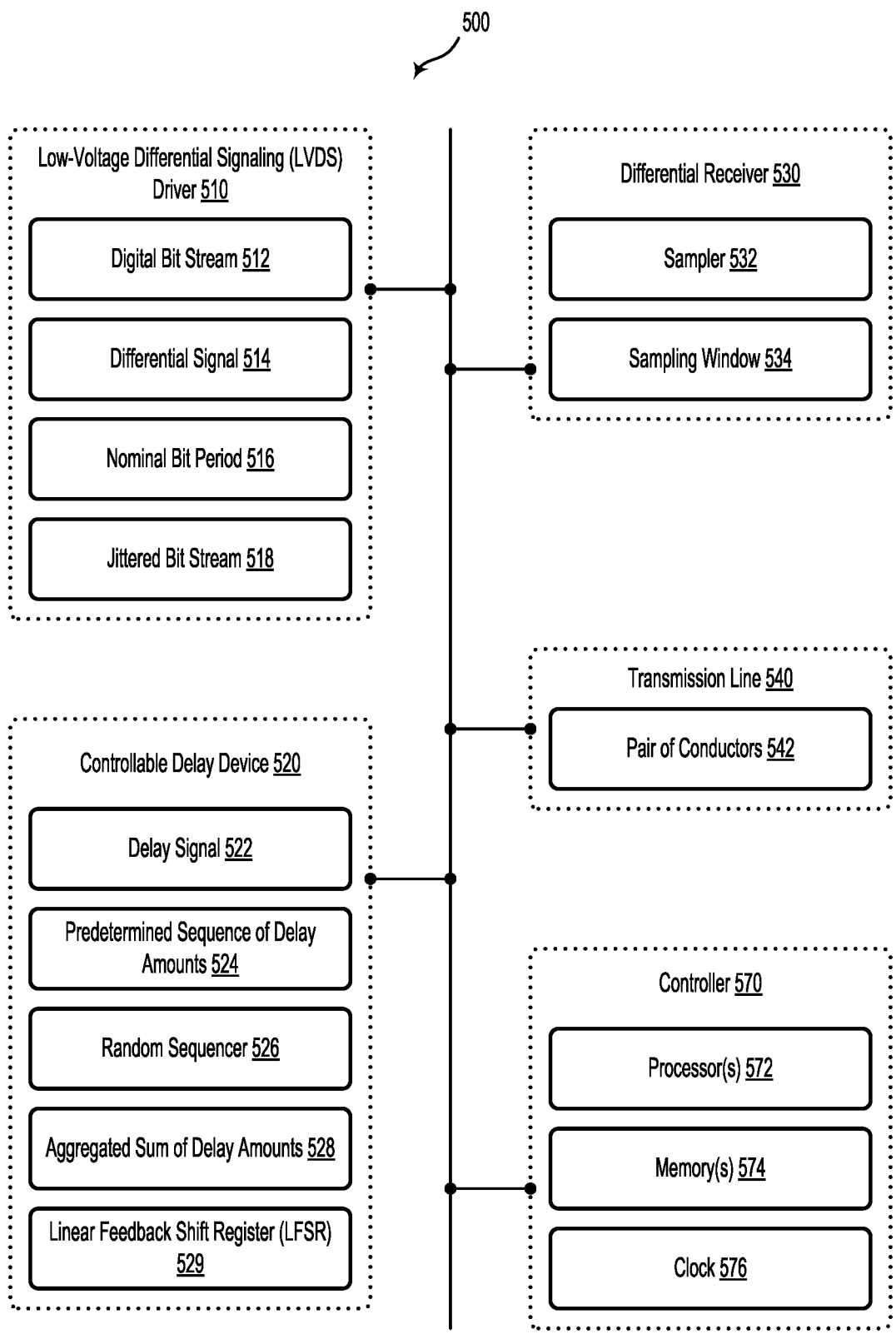
FIG. 5B is a functional block diagram of a communication link, according to example embodiments.

FIG. 5B is a functional block diagram of communication link 500, according to example embodiments. As an example, communication link 500 includes a low-voltage differential signaling (LVDS) driver 510. The LVDS driver 510 is configured to provide a differential signal 514 that is based on a digital bit stream 512. In such a scenario, the digital bit stream 512 represents a series of digital bits that are temporally arranged based on a nominal bit period 516. The nominal bit period 516 could include, for example, a default or predetermined amount of time that the digital bit stream 512 stays high or low to indicate digital bit information. As an example, the nominal bit period 516 could be based on an integer number of clock cycles needed by the receiver to determine a digital bit value from the digital bit stream 512. In an example embodiment, the LVDS driver 510 could be configured to operate between 1 MHz to 1 GHz. However, it will be understood that other operational frequencies for the LVDS driver 510 are possible and contemplated.

The communication link 500 also includes a controllable delay device 520. The controllable delay device 520 is configured to provide a delay signal 522 to the LVDS driver 510 so as to cause a rising edge or a falling edge (e.g., leading edge or trailing edge) of the signal associated with the respective digital bits to vary in time with respect to the nominal bit period 516 based on a predetermined sequence of delay amounts 524. In some embodiments, the delay amounts represent positive and negative differences in time from the nominal bit period 516.

In various embodiments, the controllable delay device 520 could have a maximum delay amount (in units of processor cycles) that is equal to half the integer number of processor cycles during a nominal bit period 516 minus one. Additionally or alternatively, the controllable delay device 520 could include a random sequencer 526 configured to determine the predetermined sequence of delay amounts 524. In some embodiments, the controllable delay device 520 could include a linear-feedback shift register (LFSR) 529. The LFSR 529 could provide, for example, a long cycle sequence of pseudo-random bits based on an initial seed value and deterministic feedback function. In an example embodiment, the LFSR 529 could provide five hundred and twelve (512) pseudo-random delay amounts 524 in a serial manner to the LVDS driver 510.

In examples, the communication link 500 also includes a differential receiver 530. The differential receiver 530 is configured to sample the digital bit stream 512 during a periodic sampling window 534 that is based on multiples of the nominal bit period 516. In some embodiments, the differential receiver 530 could include a sampler 532 configured to provide a digital output based on an amplitude of the digital bit stream 512 during a sample period. In some embodiments, the periodic sampling window 534 is independent of the predetermined sequence of delay amounts 524. In other words, the sampler 532 may receive no shared information about the sequence of delay amounts 524 or amount of jitter applied to each bit.

In various example embodiments, the communication link 500 could include a transmission line 540 that is coupled between the LVDS driver 510 and the differential receiver 530. In such a scenario, the transmission line 540 could include a pair of conductors 542. In some examples, the pair of conductors 542 could include at least one of: a pair of balanced lines, a twisted pair, a ribbon cable, or traces on a printed circuit board.

In some examples, the communication link 500 could include a controller 570. The controller 570 could include a memory 574 and at least one processor 572. The at least one processor 572 is operable to execute program instructions stored in the memory 574 so as to carry out operations. As an example, the operations could include determining, by the controllable delay device 520, the predetermined sequence of delay amounts 524.

The operations also include receiving information indicative of the digital bit stream 512. In some embodiments, receiving the information corresponding to the digital bit stream 512 could include receiving a fixed-frequency data stream of digital sensor information, such as that from a lidar or another type of sensor.

The operations yet further include providing the predetermined sequence of delay amounts 524 to the LVDS driver 510. In some examples, an aggregated sum and/or a rolling average of the predetermined sequence of delay amounts 524 is approximately zero. That is, the delay amounts provided to the LVDS driver 510 could be controlled so that the bit values from the digital bit stream 512 could still be reliably sampled from a jittered bit stream 518. In some embodiments, the jittered bit stream 518 could represent a version of the digital bit stream 512 where portions of the rising or falling edges of the digital bit stream have been shifted in time (or "jittered") according to the delay amounts 524.

The operations additionally include forming, based on the digital bit stream 512 and the predetermined sequence of delay amounts 524, a differential signal 514 representing a series of digital bits of a jittered bit stream 518. In such a scenario, each digital bit may be delayed with respect to the nominal bit period 516 by a respective delay amount 524.

In some embodiments, the at least one processor 572 includes a clock 576 configured to define a processor cycle. In such scenarios, the nominal bit period 516 could correspond to an integer multiple of processor cycles.

Figure 6:
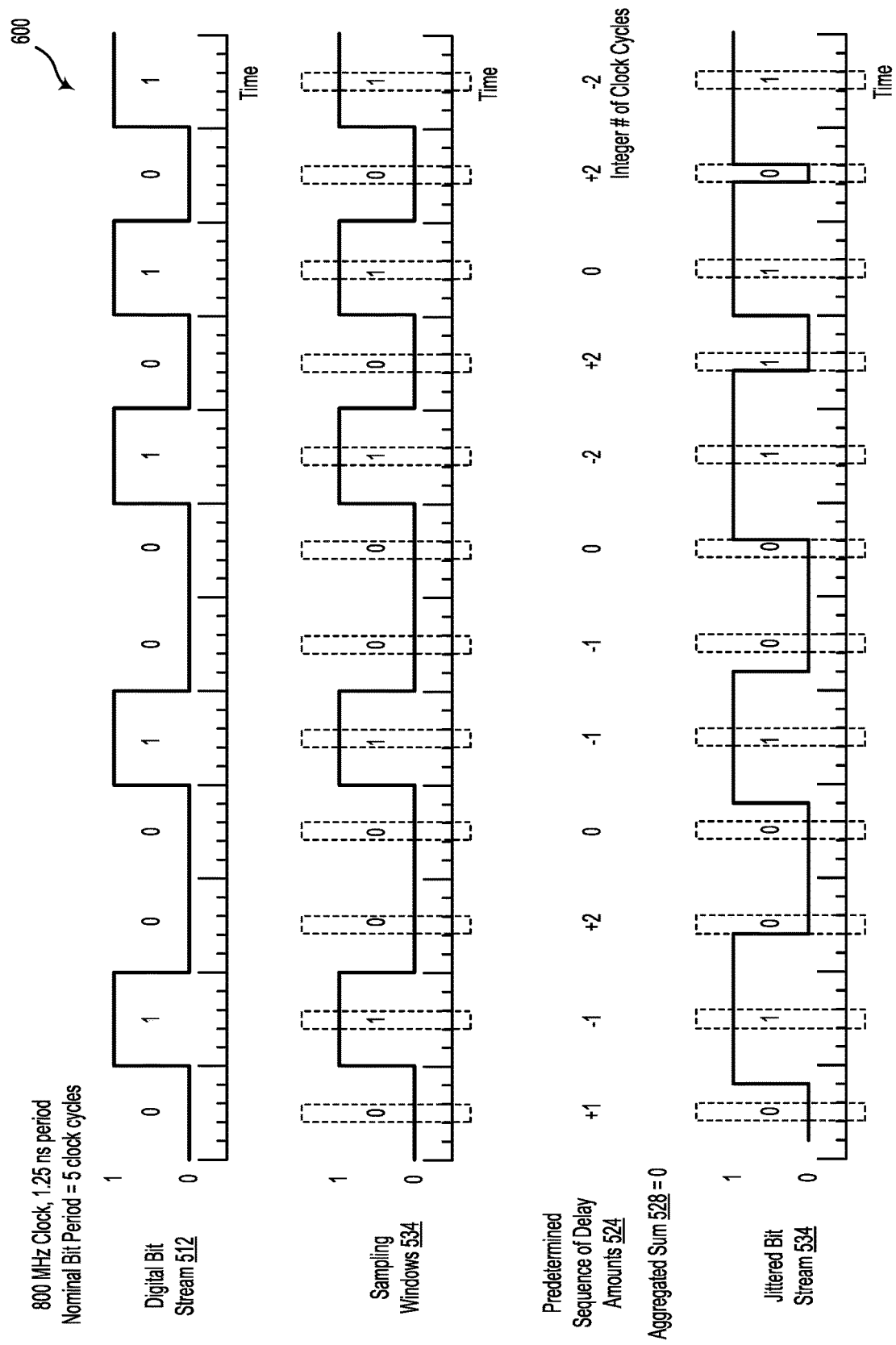
FIG. 6 is an illustration of an operation scenario, according to example embodiments.

FIG. 6 is an illustration of an operation scenario 600, according to example embodiments. Operation scenario 600 relates to a communication link (e.g., communication link 500) based on a processor clock operating at 800 MHZ, 1.25 ns period. Furthermore, the nominal bit period 516 is equal to five clock cycles. As illustrated in FIG. 6, the time axis includes small ticks to indicate individual clock cycles and large ticks to indicate each nominal bit period 516. In such a scenario, a leading edge of the bit transitions could occur substantially based on an integer number of clock cycles (e.g., every 5 clock cycles).

FIG. 6 illustrates an example digital bit stream 512, which may include a fixed-frequency signal over time. As an example, the digital bit stream 512 could indicate a bit sequence of [010010010101]. It will be understood that this particular bit sequence is provided for illustrative purposes only and that other bit sequences are possible and contemplated.

According to FIG. 6, sampling windows 534 could be controlled or set so as to take place during the third clock cycle of each nominal bit period 516. It will be understood that the sampling windows 534 could be configured to take place during a different clock cycle of the nominal bit period 516. The sampling windows 534 represent the period of time during which the sampler 532 could be configured to sense an amplitude of the differential signal 514.

As illustrated in FIG. 6, the predetermined sequence of delay amounts 524 could include a series of integer values between −2 and +2. It will be understood that for nominal bit periods with more clock cycles, it may be possible and/or preferable to increase the magnitude of possible delay amounts. As shown in the operation scenario 600, the predetermined sequence of delay amounts 524 could be [+1−1+2 0−1 −1 0−2+2 0+2−2]. As an example, a "+1" delay amount would correspond to adjusting a rising or falling edge of a particular bit of the digital bit stream 512 to occur one clock cycle later in time (adding a delay of one clock cycle) compared to the nominal bit period 516. Meanwhile, a "−2" delay amount would correspond to adjusting the rising or falling edge of the particular bit of the digital bit stream 512 to occur two clock cycles earlier based on the nominal bit period 516.

In some embodiments, as described herein, the aggregated sum 528 of the predetermined sequence of delay amounts 524 could be controlled to be approximately equal to zero. That is, the sequence of delay amounts (or a rolling average of delay amounts) could be substantially zero so as to reduce the risk of temporal drift, which could result in undesirable sampling errors.

As described herein, the LVDS driver 510 could be configured to adjust a leading edge of a corresponding bit of the digital bit stream 512 based on the delay amount 524. As an example, the leading edge of the left-most bit could be delayed by +1 processor cycle. The second jittered bit could have its leading edge advanced by −1 processor cycle. As illustrated in FIG. 6, jittered bit stream 518 could be represented by "high" or "low" signals as long in duration as 9 clock cycles and as short as one clock cycle.

Operation scenario 600 illustrates one particular example for a specific combination of processor clock frequency and nominal bit period 516, among other factors. Accordingly, it will be understood that many other examples involving different clock frequencies and/or nominal bit periods are possible and contemplated.

As a non-limiting example, the LVDS driver 510 could have an operating frequency between 10 MHz-100 MHz. In such a scenario, the sample window could take place during the fifth processor cycle of each nominal bit period and sampling could occur every 10 clock cycles. In such scenarios, the leading edge of the bit information could move around by −5 to +4 clock cycles. Other combinations are possible and contemplated.

Figure 7:
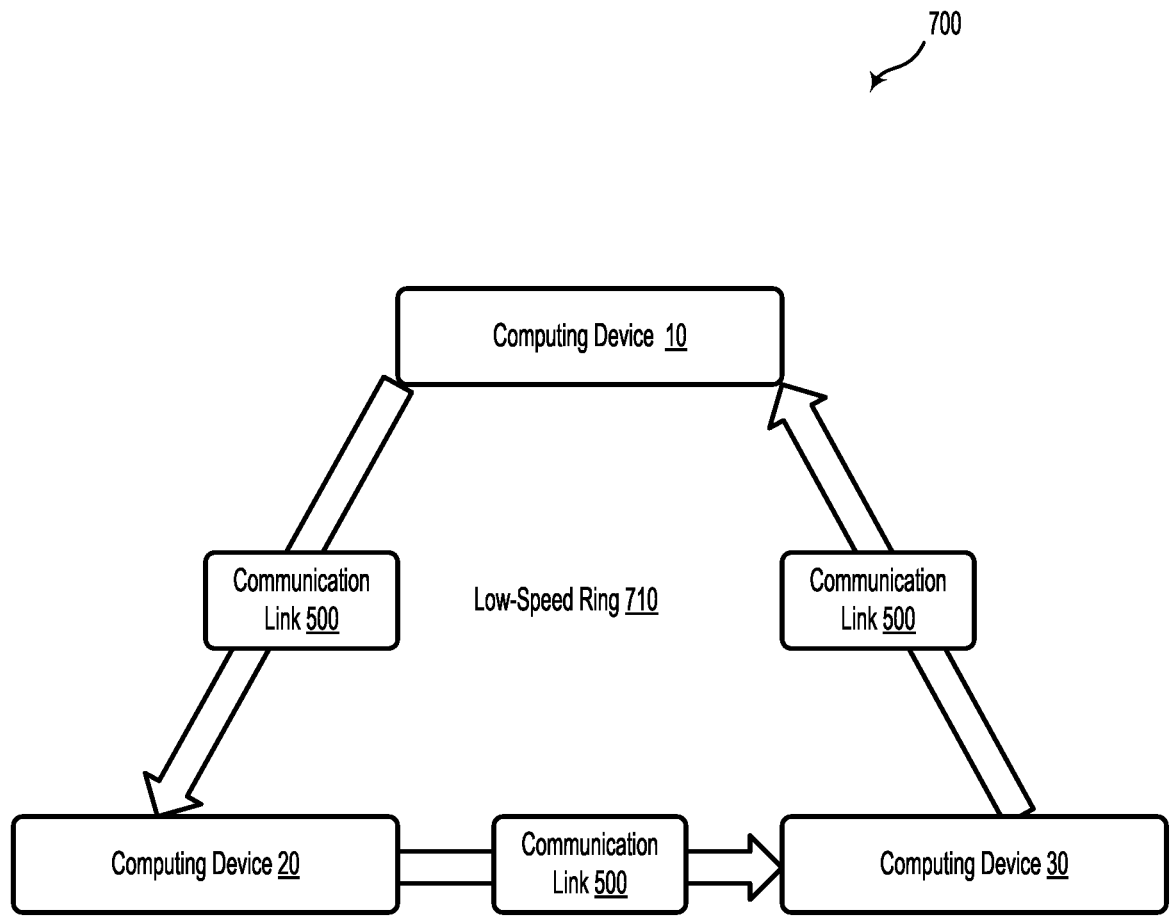
FIG. 7 is a functional block diagram of a computing system, according to example embodiments.

FIG. 7 is a functional block diagram of a computing system 700, according to example embodiments. A computing system 700 could be similar or identical to some or all elements of communication link 500. In an example embodiment, computing system 700 could be a portion of a lidar (e.g., lidar device 410).

As illustrated in FIG. 7, computing system 700 could include a plurality of computing devices (e.g., computing device 10, computing device 20, and computing device 30). Each of the computing devices could represent a single chip of a multi-processor system, (e.g., a lidar receiver). The plurality of computing devices 10, 20, and 30 of computing system 700 could be communicatively coupled with one or more communication links 500. In such a scenario, the computing devices could represent nodes of a low-speed ring 710.

In some examples, computing system 700 includes a low-voltage differential signaling (LVDS) driver (e.g., LVDS driver 510). The LVDS driver is configured to provide a differential signal (e.g., differential signal 514) that is indicative of a digital bit stream (e.g., digital bit stream 512). The digital bit stream includes a series of digital bits that are temporally arranged based on a nominal bit period (e.g., nominal bit period 516).

The computing system 700 also includes a controllable delay device (e.g., controllable delay device 520). In such scenarios, the controllable delay device is configured to provide a delay signal (e.g., delay signal 522) to the LVDS driver so as to cause a rising edge or a falling edge (e.g., leading edge or trailing edge) of respective digital bits to vary in time with respect to the nominal bit period based on a predetermined sequence of delay amounts (e.g., predetermined sequence of delay amounts 524). In some embodiments, the delay amounts represent positive and negative differences in time from the nominal bit period.

The computing system 700 additionally includes a controller (e.g., controller 570). The controller comprises a memory (e.g., memory 574) and at least one processor (e.g., processor 572). In such scenarios, the at least one processor is operable to execute program instructions stored in the memory so as to carry out operations. The operations include determining, by the controllable delay device, the predetermined sequence of delay amounts. The operations additionally include receiving information indicative of the digital bit stream and forming by the LVDS driver, based on the digital bit stream and the predetermined sequence of delay amounts, a jittered bit stream (e.g., jittered bit stream 518) representing a series of digital bits. In such examples, each digital bit is delayed with respect to the nominal bit period by the respective delay amount.

In some embodiments, a maximum delay amount is equal to half an integer number of processor cycles associated with the nominal bit period minus one cycle. It will be understood that other limitations to the delay amounts are possible and contemplated.

The computing system 700 also includes a differential receiver (e.g., differential receiver 530) that is configured to sample the digital bit stream during a periodic sampling window (e.g., sampling window 534) that is based on the nominal bit period. In such scenarios, the periodic sampling window is independent of the predetermined sequence of delay amounts. In other words, the differential receiver 530 may be unaware of the predetermined sequence of delay amounts.

The computing system 700 may additionally include a transmission line (e.g., transmission line 540) coupled between the LVDS driver and the differential receiver. The transmission line includes a pair of conductors (e.g., pair of conductors 542). The pair of conductors could include at least one of: a pair of balanced lines, a twisted pair, a ribbon cable, or traces on a printed circuit board.

The computing system 700 could be controlled so that an aggregated sum (e.g., aggregated sum 528) of the predetermined sequence of delay amounts could substantially be zero.

In some example embodiments, the computing system 700 could include a housing. In such scenarios, a footprint of the housing could be 8×8 mm$^2$ or smaller.

The computing system 700 could include at least one mixed signal (analog and/or digital) integrated circuit.

Figure 8:
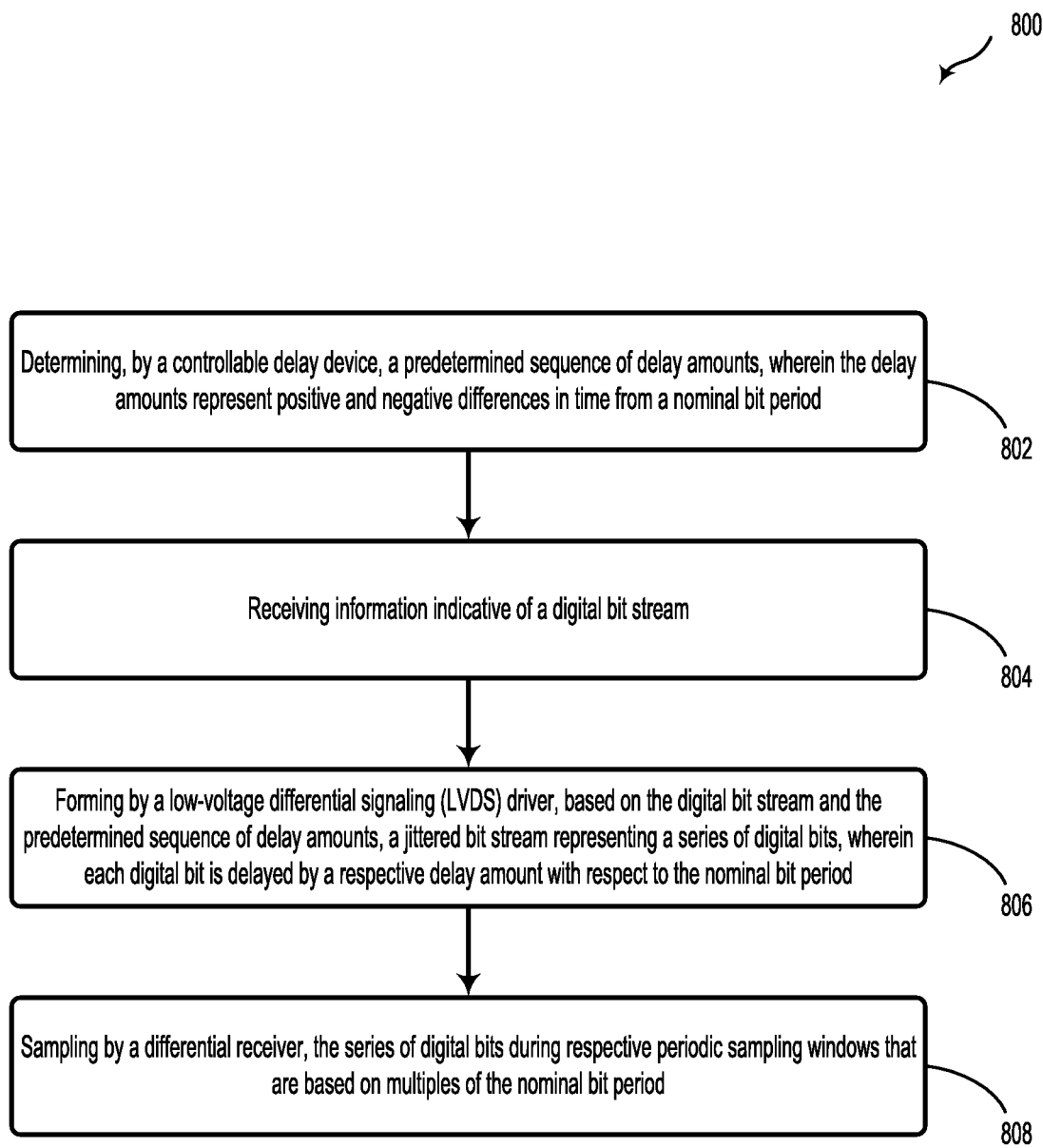
FIG. 8 illustrates a method, according to example embodiments.

FIG. 8 illustrates a method 800, according to example embodiments. While method 800 illustrates several blocks of a method, it will be understood that fewer or more blocks or steps could be included. In such scenarios, at least some of the various blocks or steps may be carried out in a different order than of that presented herein. Furthermore, blocks or steps may be added, subtracted, transposed, and/or repeated. Some or all of the blocks or steps of method 800 could be carried out by communication link 500 and/or computing system 700 and/or in association with operations of various lidar systems described herein (e.g., lidar system 128 or lidar system 410), as illustrated and described in reference to FIGS. 1, 4B, 5, and 7.

Block 802 includes determining, by a controllable delay device (e.g., controllable delay device 520), a predetermined sequence of delay amounts (e.g., predetermined sequence of delay amounts 524). In such a scenario, the delay amounts could represent positive and negative differences in time from a nominal bit period (e.g., nominal bit period 516). As illustrated in FIG. 6, the delay amounts could include, for example, positive and negative integer multiples of processor cycles. Furthermore, an aggregated sum or rolling average of the delay amounts could be controlled to be substantially zero to avoid delay drift, which could lead to digital sampling errors, among other potential problems.

Block 804 includes receiving information indicative of a digital bit stream (e.g., digital bit stream 512). In example embodiments, receiving the digital bit stream could include receiving information indicative of a series of digital bits based on a fixed frequency.

Block 806 includes forming by a low-voltage differential signaling (LVDS) driver (e.g., LVDS driver 510), based on the digital bit stream and the predetermined sequence of delay amounts, a jittered bit stream (e.g., jittered bit stream 518) representing a series of digital bits. In such a scenario, each digital bit is delayed by a respective delay amount with respect to the nominal bit period.

Block 808 includes sampling by a differential receiver (e.g., differential receiver 530), the series of digital bits during respective periodic sampling windows (e.g., periodic sampling windows 534) that are based on multiples of the nominal bit period.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A communication link, comprising:
   a low-voltage differential signaling (LVDS) driver, wherein the LVDS driver is configured to provide a differential signal that is based on a digital bit stream, wherein the digital bit stream comprises a series of digital bits that are temporally arranged based on a nominal bit period; and
   a controllable delay device, wherein the controllable delay device is configured to provide a delay signal to the LVDS driver so as to cause a rising edge or a falling edge of respective digital bits to vary in time with respect to the nominal bit period based on a predetermined sequence of delay amounts, wherein the delay amounts represent positive and negative differences in time from the nominal bit period.

2. The communication link of claim 1, wherein a maximum delay amount is equal to half an integer number of processor cycles associated with the nominal bit period minus one cycle.

3. The communication link of claim 1, further comprising:
   a differential receiver, wherein the differential receiver is configured to sample the digital bit stream during a periodic sampling window that is based on multiples of the nominal bit period.

4. The communication link of claim 3, wherein the periodic sampling window is independent of the predetermined sequence of delay amounts.

5. The communication link of claim 3, further comprising:
   a transmission line coupled between the LVDS driver and the differential receiver.

6. The communication link of claim 5, wherein the transmission line comprises a pair of conductors, wherein the pair of conductors comprises at least one of: a pair of balanced lines, a twisted pair, a ribbon cable, or traces on a printed circuit board.

7. The communication link of claim 1, wherein the controllable delay device comprises a random sequencer configured to determine the predetermined sequence of delay amounts.

8. The communication link of claim 1, wherein the LVDS driver is configured to operate between 1 MHz to 1 GHz.

9. The communication link of claim 1, further comprising a controller, wherein the controller comprises a memory and at least one processor, wherein the at least one processor is operable to execute program instructions stored in the memory so as to carry out operations, the operations comprising:
   determining, by the controllable delay device, the predetermined sequence of delay amounts;
   receiving information indicative of the digital bit stream;
   providing the predetermined sequence of delay amounts to the LVDS driver; and
   forming, based on the digital bit stream and the predetermined sequence of delay amounts, a differential signal representing a series of digital bits of a jittered bit stream, wherein each digital bit is delayed with respect to the nominal bit period by a respective delay amount.

10. The communication link of claim 9, wherein the at least one processor comprises a clock configured to define a processor cycle, wherein the nominal bit period corresponds to an integer multiple of processor cycles.

11. The communication link of claim 9, wherein an aggregated sum of the predetermined sequence of delay amounts is zero.

12. A computing system comprising:
    a low-voltage differential signaling (LVDS) driver, wherein the LVDS driver is configured to provide a differential signal that is indicative of a digital bit stream, wherein the digital bit stream comprises a series of digital bits that are temporally arranged based on a nominal bit period;
    a controllable delay device, wherein the controllable delay device is configured to provide a delay signal to the LVDS driver so as to cause a rising edge or a falling edge of respective digital bits to vary in time with respect to the nominal bit period based on a predetermined sequence of delay amounts, wherein the delay amounts represent positive and negative differences in time from the nominal bit period; and
    a controller, wherein the controller comprises a memory and at least one processor, wherein the at least one processor is operable to execute program instructions stored in the memory so as to carry out operations, the operations comprising:
    determining, by the controllable delay device, the predetermined sequence of delay amounts;
    receiving information indicative of the digital bit stream; and
    forming by the LVDS driver, based on the digital bit stream and the predetermined sequence of delay amounts, a jittered bit stream representing a series of digital bits, wherein each digital bit is delayed with respect to the nominal bit period by the respective delay amount.

13. The computing system of claim 12, wherein a maximum delay amount is equal to half an integer number of processor cycles associated with the nominal bit period minus one cycle.

14. The computing system of claim 12, further comprising:
    a differential receiver, wherein the differential receiver is configured to sample the digital bit stream during a periodic sampling window that is based on the nominal bit period.

15. The computing system of claim 14, wherein the periodic sampling window is independent of the predetermined sequence of delay amounts.

16. The computing system of claim 14, further comprising:
    a transmission line coupled between the LVDS driver and the differential receiver, wherein the transmission line comprises a pair of conductors, wherein the pair of conductors comprises at least one of: a pair of balanced lines, a twisted pair, a ribbon cable, or traces on a printed circuit board.

17. The computing system of claim 12, wherein an aggregated sum of the predetermined sequence of delay amounts is zero.

18. The computing system of claim 12, wherein the computing system comprises a housing, wherein a footprint of the housing is 8×8 mm2 or smaller.

19. The computing system of claim 12, wherein the computing system comprises at least one mixed signal integrated circuit.

* * * * *